(12) United States Patent
Marc-Aurele et al.

(10) Patent No.: US 11,244,102 B2
(45) Date of Patent: Feb. 8, 2022

(54) SYSTEMS AND METHODS FOR FACILITATING DATA OBJECT EXTRACTION FROM UNSTRUCTURED DOCUMENTS

(71) Applicant: Palantir Technologies Inc., Palo Alto, CA (US)

(72) Inventors: Brandon Marc-Aurele, Arlington, VA (US); John Doyle, Washington, DC (US)

(73) Assignee: Palantir Technologies Inc., Palo Alto, CA (US)

(*) Notice: Subject to any disclaimer, the term of this patent is extended or adjusted under 35 U.S.C. 154(b) by 61 days.

(21) Appl. No.: 16/799,788

(22) Filed: Feb. 24, 2020

(65) Prior Publication Data

US 2020/0250370 A1 Aug. 6, 2020

Related U.S. Application Data

(63) Continuation of application No. 15/633,239, filed on Jun. 26, 2017, now Pat. No. 10,572,576.
(Continued)

(51) Int. Cl.
*G06F 40/117* (2020.01)
*G06F 40/169* (2020.01)
(Continued)

(52) U.S. Cl.
CPC .......... *G06F 40/117* (2020.01); *G06F 40/169* (2020.01); *G06F 40/279* (2020.01); *G06F 40/295* (2020.01)

(58) Field of Classification Search
CPC ...... G06F 16/367; G06F 16/285; G06F 40/00; G06F 40/30; G06F 40/186; G06F 3/0488;
(Continued)

(56) References Cited

U.S. PATENT DOCUMENTS 5,418,950 A 5/1995 Li et al.
5,428,737 A 6/1995 Li et al.
(Continued)

FOREIGN PATENT DOCUMENTS

DE 102014103482 A1 9/2014
EP 1647908 A2 4/2006
(Continued)

OTHER PUBLICATIONS

"A Quick Guide to UniProtKB Swiss-Prot & TrEMBL," Sep. 2011, pp. 2.
(Continued)

*Primary Examiner* — Olujimi A Adesanya
(74) *Attorney, Agent, or Firm* — Sheppard Mullin Richter & Hampton LLP

(57) ABSTRACT

Systems and methods are provided for facilitating data object extraction from unstructured documents. Unstructured documents may include data in an unorganized format, such as raw text. The system may use natural language processing to determine characteristics of the terms used in the unstructured document. The system may prompt a user to select terms from the document corresponding in characteristics to properties of a data object being generated. The user may select terms from the document and the system may generate a data object according to the selected terms.

20 Claims, 5 Drawing Sheets

Related U.S. Application Data

(60) Provisional application No. 62/482,457, filed on Apr. 6, 2017.

(51) Int. Cl.
*G06F 40/279* (2020.01)
*G06F 40/295* (2020.01)

(58) Field of Classification Search
CPC .... G06F 40/205; G06F 40/279; G06F 40/295; G06F 8/24; G06F 16/3338; G06F 16/334; G06F 40/169; G06F 40/56; G06F 16/243; G06F 16/36; G06F 40/117; G06F 40/237; G06F 40/268; G06F 40/284; G06F 16/322; G06F 16/951; G06F 16/986; G06F 8/38

See application file for complete search history.

(56) References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bingham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,643,613 B2 | 11/2003 | McGee et al. |
| 6,745,382 B1 | 6/2004 | Zothner |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 7,028,223 B1 | 4/2006 | Kolawa et al. |
| 7,085,890 B2 | 8/2006 | Kashyap |
| 7,155,728 B1 | 12/2006 | Prabhu et al. |
| 7,216,133 B2 | 5/2007 | Wu et al. |
| 7,299,202 B2 | 11/2007 | Swanson |
| 7,406,592 B1 | 7/2008 | Polyudov |
| 7,496,840 B2 | 2/2009 | Hailey |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,783,679 B2 | 8/2010 | Bley |
| 7,853,573 B2 | 12/2010 | Warner et al. |
| 7,877,421 B2 | 1/2011 | Berger et al. |
| 7,908,521 B2 | 3/2011 | Sridharan et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,442,940 B1 | 5/2013 | Faletti |
| 8,499,287 B2 | 7/2013 | Shafi et al. |
| 8,560,494 B1 | 10/2013 | Downing |
| 8,589,366 B1 | 11/2013 | Younes |
| 8,639,552 B1 | 1/2014 | Chen et al. |
| 8,799,867 B1 | 8/2014 | Peri-Glass et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,031,981 B1 | 5/2015 | Potter et al. |
| 9,105,000 B1 | 8/2015 | White et al. |
| 9,292,388 B2 | 3/2016 | Fisher et al. |
| 9,330,120 B2 | 5/2016 | Colgrove et al. |
| 9,348,677 B2 | 5/2016 | Marinelli, III et al. |
| 9,378,526 B2 | 6/2016 | Sampson |
| 9,411,799 B2 | 8/2016 | Hewett |
| 9,922,108 B1 * | 3/2018 | Meiklejohn ........... G06F 16/289 |
| 10,019,537 B1 * | 7/2018 | Tsypliaev ............ G06F 16/9024 |
| 10,572,576 B1 * | 2/2020 | Marc-Aurele ........ G06F 40/117 |
| 2002/0194379 A1 | 12/2002 | Bennett |
| 2003/0004770 A1 | 1/2003 | Miller et al. |
| 2003/0023620 A1 | 1/2003 | Trotta |
| 2003/0041077 A1 * | 2/2003 | Davis .................... G06F 40/143 |
| | | 715/205 |
| 2003/0105833 A1 | 6/2003 | Daniels |
| 2003/0212670 A1 | 11/2003 | Yalamanchi et al. |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0126840 A1 | 7/2004 | Cheng et al. |
| 2004/0139212 A1 | 7/2004 | Mukherjee et al. |
| 2004/0153837 A1 | 8/2004 | Preston et al. |
| 2004/0193608 A1 | 9/2004 | Gollapudi et al. |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0021397 A1 | 1/2005 | Cui et al. |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0209085 A1 | 9/2006 | Wong et al. |
| 2006/0271838 A1 | 11/2006 | Carro |
| 2006/0271884 A1 | 11/2006 | Hurst |
| 2006/0288046 A1 | 12/2006 | Gupta et al. |
| 2007/0005582 A1 | 1/2007 | Navratil et al. |
| 2007/0027851 A1 | 2/2007 | Kruy et al. |
| 2007/0094248 A1 | 4/2007 | McVeigh et al. |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0267386 A1 | 10/2008 | Cooper |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248721 A1 | 10/2009 | Burton et al. |
| 2009/0282068 A1 | 11/2009 | Shockro et al. |
| 2009/0299830 A1 | 12/2009 | West et al. |
| 2010/0011282 A1 | 1/2010 | Dollard et al. |
| 2010/0070464 A1 | 3/2010 | Aymeloglu et al. |
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |

(56) References Cited

U.S. PATENT DOCUMENTS

| | | |
|---|---|---|
| 2010/0169405 A1 | 7/2010 | Zhang |
| 2010/0199167 A1 | 8/2010 | Uematsu et al. |
| 2010/0241620 A1 | 9/2010 | Manister |
| 2010/0313119 A1 | 12/2010 | Baldwin et al. |
| 2011/0035396 A1 | 2/2011 | Merz et al. |
| 2011/0041084 A1 | 2/2011 | Karam |
| 2011/0055699 A1* | 3/2011 | Li .................. G06F 16/951 715/709 |
| 2011/0066497 A1 | 3/2011 | Gopinath et al. |
| 2011/0074811 A1 | 3/2011 | Hanson et al. |
| 2011/0093471 A1* | 4/2011 | Brockway .......... G06F 16/313 707/747 |
| 2011/0093490 A1 | 4/2011 | Schindlauer et al. |
| 2011/0131547 A1 | 6/2011 | Elaasar |
| 2011/0145401 A1 | 6/2011 | Westlake |
| 2011/0208822 A1 | 8/2011 | Rathod |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0295595 A1 | 12/2011 | Cao |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0278363 A1 | 11/2012 | Fang |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0198624 A1 | 8/2013 | Aymeloglu et al. |
| 2013/0218899 A1* | 8/2013 | Raghavan .......... G06F 16/156 707/741 |
| 2013/0225212 A1 | 8/2013 | Khan |
| 2013/0226944 A1 | 8/2013 | Baid et al. |
| 2013/0232220 A1 | 9/2013 | Sampson |
| 2013/0268852 A1 | 10/2013 | Hewett |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0214579 A1 | 7/2014 | Shen et al. |
| 2014/0244388 A1 | 8/2014 | Manouchehri et al. |
| 2014/0282120 A1* | 9/2014 | Sun .................. G06F 16/9558 715/760 |
| 2015/0046791 A1 | 2/2015 | Isaacson |
| 2015/0112641 A1 | 4/2015 | Faraj |
| 2015/0234549 A1* | 8/2015 | Mingione .......... G06F 3/0482 715/739 |
| 2015/0269030 A1 | 9/2015 | Fisher et al. |
| 2016/0026923 A1 | 1/2016 | Erenrich et al. |
| 2016/0232152 A1* | 8/2016 | Mahamood .......... G06F 40/186 |
| 2017/0344548 A1* | 11/2017 | Tietjen ................ G06F 16/2255 |
| 2018/0173795 A1 | 6/2018 | Cobbett |

FOREIGN PATENT DOCUMENTS

| | | |
|---|---|---|
| EP | 2634745 A1 | 9/2013 |
| EP | 2743839 A1 | 6/2014 |
| EP | 2778986 A1 | 9/2014 |
| EP | 2921975 A1 | 9/2015 |
| GB | 2366498 A | 3/2002 |
| GB | 2508293 A | 5/2014 |
| GB | 2508503 A | 6/2014 |
| HK | 1194178 A1 | 9/2015 |
| NZ | 622485 A | 11/2014 |
| NZ | 616212 A | 1/2015 |
| NZ | 616299 A | 4/2015 |
| WO | WO-0034895 A1 | 6/2000 |
| WO | WO-2010030917 | 3/2010 |
| WO | WO-2013030595 | 3/2013 |

OTHER PUBLICATIONS

"A Tour of Pinboard," <http://pinboard.in/tour> as printed May 15, 2014 in 6 pages.

Alur et al., "Chapter 2: IBM InfoSphere DataStage Stages," IBM InfoSphere DataStage Data Flow and Job Design, Jul. 1, 2008, pp. 35-137.

Anonymous, "Frequently Asked Questions about Office Binder 97," http://web.archive.org/web/20100210112922/http://support.microsoft.com/kb-/843147 printed Dec. 18, 2006 in 5 pages.

Bae et al., "Partitioning Algorithms for the Computation of Average Iceberg Queries," DaWaK 2000, LNCS 1874, pp. 276_286.

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle, Phillip Lee, "Reducing Cross-Domain Call Overhead Using Batched Futures," May 1994, Massachusetts Institute of Technology, pp. 96.

Bogle et al., "Reducing Cross-Domain Call Overhead Using Batched Futures," SIGPLAN No. 29, Oct. 10, 1994 pp. 341-354.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Canese et al., "Chapter 2: PubMed: The Bibliographic Database," The NCBI Handbook, Oct. 2002, pp. 1-10.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Delcher et al., "Identifying Bacterial Genes and Endosymbiont DNA with Glimmer," BioInformatics, vol. 23, No. 6, 2007, pp. 673-679.

Delicious, <http://delicious.com/> as printed May 15, 2014 in 1 page.

Donjerkovic et al., "Probabilistic Optimization of Top N Queries," Proceedings of the 25th VLDB Conference, Edinburgh, Scotland, 1999, pp. 411-422.

Fang et al., "Computing Iceberg Queries Efficiently," Proceedings of the 24th VLDB Conference New York, 1998, pp. 299-310.

Frantisek et al., "An Architectural View of Distributed Objects and Components in CORBA, Java RMI and COM/DCOM," Software—Concepts & Tools, vol. 19, No. 1, Jun. 1, 1998, pp. 14-28.

Goldstein et al., "Stacks Lazy Threads: Implementing a Fast Parallel Call," Journal of Parallel and Distributed Computing, Jan. 1, 1996, pp. 5-20.

Han et al., "Efficient Computation of Iceberg Cubes with Complex Measures," ACM Sigmod, May 21-24, 2001, pp. 1-12.

Ivanova et al., "An Architecture for Recycling Intermediates in a Column-Store," Proceedings of the 35th Sigmod International Conference on Management of Data, Sigmod '09, Jun. 29, 2009, p. 309.

Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expressio- n-parser-with-plug-ins>.

"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.

Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.

Kahan et al., "Annotea: An Open RDF Infrastructure for Shared Web Annotations", Computer Networks, Elsevier Science Publishers B.V., vol. 39, No. 5, dated Aug. 5, 2002, pp. 589-608.

(56) References Cited

OTHER PUBLICATIONS

Karp et al., "A Simple Algorithm for Finding Frequent Elements in Streams and Bags," ACM Transactions on Database Systems, vol. 28, No. 1, Mar. 2003, pp. 51 55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Notice of Acceptance for New Zealand Patent Application No. 622485 dated Nov. 24, 2014.
Notice of Acceptance for New Zealand Patent Application No. 616212 dated Jan. 23, 2015.
Notice of Acceptance for New Zealand Patent Application No. 616299 dated Apr. 7, 2015.
Notice of Allowance for U.S. Appl. No. 14/254,773 dated Aug. 20, 2014.
Notice of Allowance for U.S. Appl. No. 14/254,757 dated Sep. 10, 2014.
Notice of Allowance for U.S. Appl. No. 14/304,741 dated Apr. 7, 2015.
Notice of Allowance for U.S. Appl. No. 13/767,779 dated Mar. 17, 2015.
Notice of Allowance for U.S. Appl. No. 14/581,902 dated Nov. 13, 2015.
Notice of Allowance for U.S. Appl. No. 13/657,635 dated Jan. 29, 2016.
Notice of Allowance for U.S. Appl. No. 14/019,534 dated Feb. 4, 2016.
Notice of Allowance for U.S. Appl. No. 13/411,291 dated Apr. 22, 2016.
Notice of Allowance for U.S. Appl. No. 13/827,627 dated Apr. 11, 2016.
Notice of Allowance for U.S. Appl. No. 13/657,656 dated May 10, 2016.
Notice of Allowance for U.S. Appl. No. 15/066,970 dated Jun. 29, 2016.
Official Communication for U.S. Appl. No. 14/877,229 dated Mar. 22, 2016.
Official Communication for U.S. Appl. No. 14/134,558 dated May 16, 2016.
Official Communication for U.S. Appl. No. 14/134,558 dated Aug. 26, 2016.
Official Communication for Australian Patent Application No. 2013237658 dated Feb. 2, 2015.
Official Communication for Australian Patent Application No. 2013237710 dated Jan. 16, 2015.
Official Communication for Australian Patent Application No. 2014201580 dated Feb. 27, 2015.
Official Communication for Canadian Patent Application No. 2807899 dated Oct. 24, 2014.
Official Communication for Canadian Patent Application No. 2807899 dated Jul. 20, 2015.
Official Communication for Canadian Patent Application No. 2828264 dated Apr. 28, 2015.
Official Communication for Canadian Patent Application No. 2828264 dated Apr. 11, 2016.
Official Communication for Canadian Patent Application No. 2829266 dated Apr. 28, 2015.
Official Communication for Canadian Patent Application No. 2829266 dated Apr. 1, 2016.
Official Communication for European Patent Application No. 13157474.1 dated Oct. 30, 2015.
Official Communication for European Patent Application No. 13157474.1 dated Apr. 29, 2016.
Official Communication for European Patent Application No. 14159175.0 dated Jul. 17, 2014.
Official Communication for European Patent Application No. 14159175.0 dated Feb. 4, 2016.
Official Communication for European Patent Application No. 14159464.8 dated Feb. 18, 2016.
Official Communication for European Patent Application No. 14159629.6 dated Jul. 31, 2014.
Official Communication for European Patent Application No. 14159629.6 dated Sep. 22, 2014.
Official Communication for European Patent Application No. 15159520.4 dated Jul. 15, 2015.
Official Communication for German Patent Application No. 10 2013 221 057.4 dated Mar. 23, 2015.
Official Communication for German Patent Application No. 10 2013 221 052.3 dated Mar. 24, 2015.
Official Communication for Great Britain Patent Application No. 1404574.4 dated Dec. 18, 2014.
Official Communication for Netherlands Patent Application No. 2011613 dated Aug. 13, 2015.
Official Communication for Netherlands Patent Application No. 2011627 dated Aug. 14, 2015.
Official Communication for Netherlands Patent Application No. 2012437 dated Sep. 18, 2015.
Official Communication for New Zealand Patent Application No. 616299 dated Jan. 26, 2015.
Official Communication for New Zealand Patent Application No. 622414 dated Mar. 24, 2014.
Official Communication for New Zealand Patent Application No. 622484 dated Apr. 2, 2014.
Official Communication for New Zealand Patent Application No. 622485 dated Nov. 21, 2014.
Official Communication for U.S. Appl. No. 13/411,291 dated Jul. 15, 2015.
Official Communication for U.S. Appl. No. 13/411,291 dated Oct. 1, 2015.
Official Communication for U.S. Appl. No. 13/608,864 dated Mar. 17, 2015.
Official Communication for U.S. Appl. No. 13/608,864 dated Jun. 8, 2015.
Official Communication for U.S. Appl. No. 13/657,635 dated Mar. 30, 2015.
Official Communication for U.S. Appl. No. 13/657,635 dated Oct. 7, 2015.
Official Communication for U.S. Appl. No. 13/657,656 dated Oct. 7, 2014.
Official Communication for U.S. Appl. No. 13/657,656 dated May 6, 2015.
Official Communication for U.S. Appl. No. 13/827,627 dated Mar. 2, 2015.
Official Communication for U.S. Appl. No. 13/827,627 dated Aug. 26, 2015.
Official Communication for U.S. Appl. No. 13/827,627 dated Oct. 20, 2015.
Official Communication for U.S. Appl. No. 13/827,627 dated Dec. 22, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 14/019,534 dated Jul. 20, 2015.
Official Communication for U.S. Appl. No. 14/019,534 dated Sep. 4, 2015.
Official Communication for U.S. Appl. No. 14/025,653 dated Oct. 6, 2015.

(56) References Cited

OTHER PUBLICATIONS

Official Communication for U.S. Appl. No. 14/025,653 dated Mar. 3, 2016.
Official Communication for U.S. Appl. No. 14/134,558 dated Oct. 7, 2015.
Official Communication for U.S. Appl. No. 14/304,741 dated Aug. 6, 2014.
Official Communication for U.S. Appl. No. 14/304,741 dated Mar. 3, 2015.
Russell et al., "NITELIGHT: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008),EAcitrezza, Catania, Italy, Sep. 29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
"The FASTA Program Package," fasta-36.3.4, Mar. 25, 2011, pp. 29.
Wikipedia, "Machine Code", p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 17, 1996, pp. 219-231.

\* cited by examiner

SYSTEMS AND METHODS FOR FACILITATING DATA OBJECT EXTRACTION FROM UNSTRUCTURED DOCUMENTS

CROSS REFERENCE TO RELATED APPLICATIONS

This application is a continuation application of U.S. patent application Ser. No. 15/633,239, filed Jun. 26, 2017, which claims the benefit under 35 U.S.C. § 119(e) of the U.S. Provisional Application Ser. No. 62/482,457 filed Apr. 6, 2017, the contents of which are hereby incorporated by reference in their entirety.

TECHNICAL FIELD

This disclosure relates to approaches for facilitating data object extraction from unstructured documents.

BACKGROUND

Under some approaches, a platform for analyzing various data may be deployed. The data-analysis platform may support an object-based data modeling framework. Data provided in an unstructured format, such as a free-form text-based document, cannot be analyzed via object-based data modeling platforms without having some form of organization applied. Document tagging may assist in classifying an unstructured document into an object format, but conventional approaches have significant drawbacks. Automated metadata tagging is typically very noisy and requires significant manual review to produce useful results. Manual tagging is laborious and frequently error-filled. Users may not fully grasp the data object structure underlying the tagging scheme. Users may struggle with the interface mechanisms of tagging. Users may be unable to satisfy complex object ontologies through manual tagging.

These and other drawbacks exist with some data management systems.

SUMMARY

A claimed solution rooted in computer technology overcomes problems specifically arising in the realm of computer technology. In various implementations, a computing system is configured to provide tools that facilitate tagging of unstructured documents for the creation of structured data objects suitable for analysis via an object-based data modeling framework. The system may provide a user with a structured tagging scheme for a class of documents and prompt the user to select a matching term from the document for each element of the structured tagging scheme. To facilitate the tagging, the system may user natural language processing analysis of the document to highlight terms from the document that may match the element. After tagging is complete, the system may transform the document into a data object based on the user tagging. The resulting computer system, thus, facilitates the creation of data objects from unstructured documents via user tagging.

The system may be used for the creation of objects within an object based data ontology from unstructured data. The data object structure may serve as a template to be applied to the unstructured data in a controlled fashion. Data objects may include multiple object properties or data fields. The object properties may be defined by the types of data that they support, e.g., names, addresses, e-mail addresses, dollar amounts, etc. To assist a user in properly tagging an unstructured document based on a data object structure template for data object creation, the system may perform natural language processing on the unstructured document. The system may then prompt the user to select phrases, terms, words, or other portions of the document that match each object property of the data object to be created, highlighting potential matches in the structured document. For example, to assist a user in defining a payment record object comprising a payee, a payor, an amount paid, and a date of payment, the system may first highlight all potential payees (e.g., proper names and/or company names) from the unstructured document and prompt the user to select the payee. The system may continue this process by, in turn, highlighting all potential payors, listed dollar amounts, and dates in the unstructured document while prompting the user to select from amongst these to populate the other object properties of the data object. After completing a data object, the system may present the user with another unstructured document to create another data object.

In some implementations, a system for extracting object data from an unstructured document is provided. The system may include one or more processors and a memory storing instructions. When executed by the one or more processors, the instructions may cause the system to receive an unstructured document comprising a plurality of terms, each term including at least one word, assign a term classification to the plurality of terms of the document via natural language processing, obtain a tagging template for the document, the tagging template including a plurality of tagging elements, each tagging element having an element classification, receive, from a user via an interface, a plurality of selected terms corresponding to the plurality of tagging elements, wherein the term classifications of the selected terms matches the element classification of the corresponding tagging elements, and generate a data object from the unstructured document based on the plurality of selected terms corresponding to the plurality of tagging elements.

In some implementations, a method for extracting object data from an unstructured document is provided. The method may be performed on a computer system having one or more physical processors programmed with computer program instructions that, when executed by the one or more physical processors, cause the computer system to perform the method. The method may include receiving, by the computer system, an unstructured document comprising a plurality of terms, each term including at least one word, assigning, by the computer system, a term classification to the plurality of terms of the document via natural language processing, obtaining, by the computer system, a tagging template for the document, the tagging template including a plurality of tagging elements, each tagging element having an element classification, receiving, by the computer system, from a user via an interface, a plurality of selected terms corresponding to the plurality of tagging elements, wherein the term classifications of the selected terms matches the element classification of the corresponding tagging elements; and generating, by the computer system a data object from the unstructured document based on the plurality of selected terms corresponding to the plurality of tagging elements.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which

DETAILED DESCRIPTION

The technology described herein relates to systems and methods for assisting a user in generating or extracting data objects from unstructured data via prompted tagging. Object and table based data structures may provide powerful tools for generating insights about data and links between data. Unstructured data, however, cannot benefit from such tools unless it is organized. Unstructured data includes data that has not been organized by a formal ontology or schema and may include, but is not limited to, raw text, notes, filled forms, and others. In some implementations, the technology may facilitate the generation or extraction of data objects from unstructured data. The technology described herein provides systems and methods for facilitating the transformation of unstructured data into a structured, tabular, or object based structure through a tagging process. The technology described herein further provides systems and methods for facilitating the application of a data ontology or schema to unstructured data to facilitate further use of the data.

Implementations may involve the organization of unstructured data into object based data structures defined by a data ontology and/or into tabular based data structures defined by a data schema.

Figure 1:
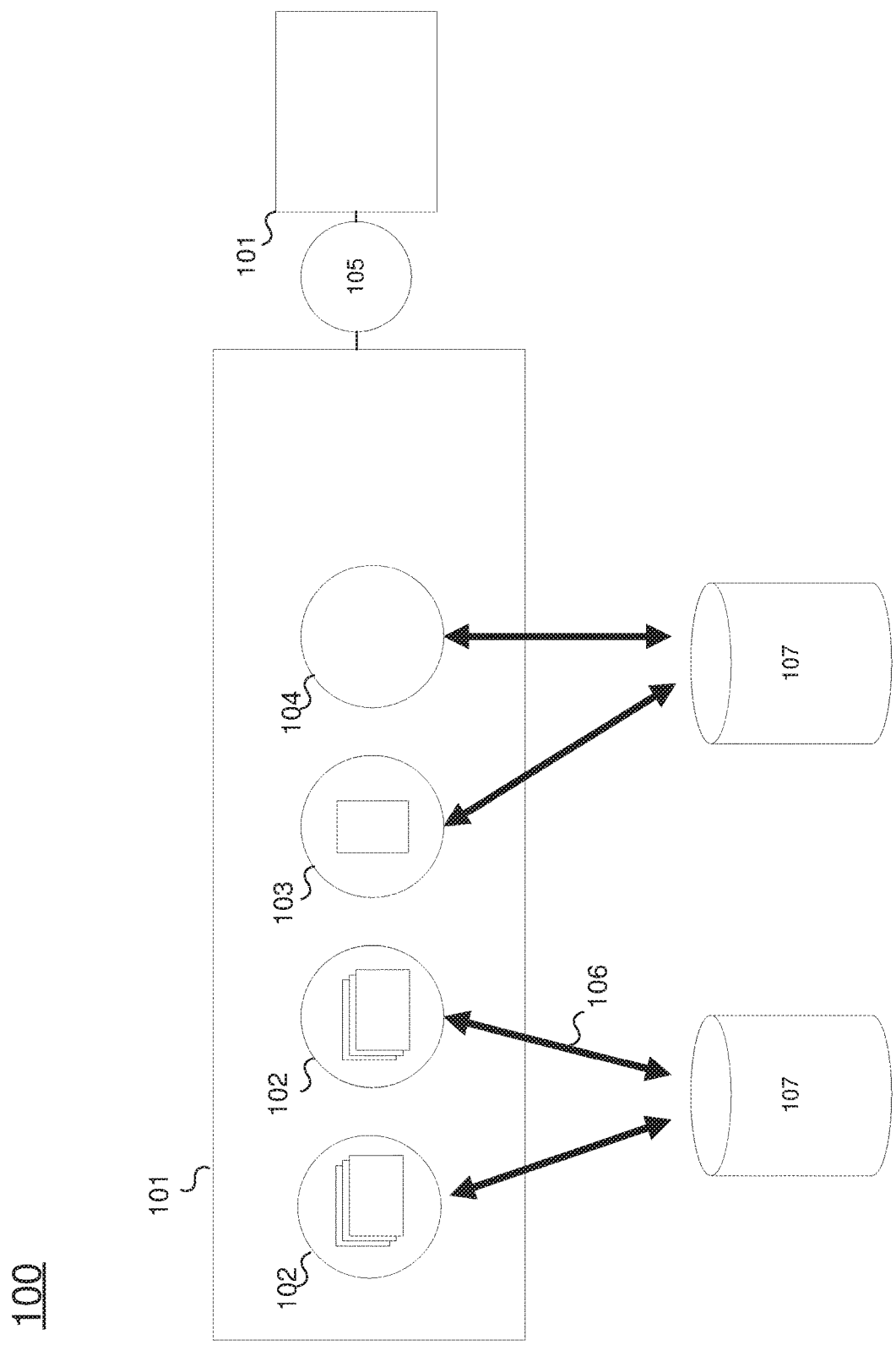
FIG. 1 depicts an object based data structure.

FIG. 1 depicts an object based data structure 100. Object based data structure 100 is centered around data objects 101. Each data object 101 may include several components, including one or more object properties 102, one or more data notes 103, one or more media components 104, and one or more data links 105. The origin of data stored in data object 101 may be stored in a data source record 106 that indicates a data source 107 of the stored data.

The object model is the framework for how data is stored. The object model is further defined by an ontology, defining the types of data and how they are stored in a given system. The ontology may be dynamic, updated to match evolving needs of the system and analysts. The ontology may define types of data objects 101, object properties 102, and data links 105. The ontology may further define which data types may be associated with each other. Each data type may have a URI (uniform resource identifier) that identifies it.

Object types define the kinds of things that may be represented in the system, and provide structure for data objects 101. Object types may be derived from, for example, entity types, event types, document types, and multimedia types. Event and document types may have temporal and geospatial data directly included within the data object 101 itself. An object type may define the number and composition of properties 102, notes 103, and media components 104 of a data object 101. The object type may further define what other types of objects that data links 105 may permit association with. For example, an entity object type may define a data object 101 used to store data about a person, and may include data properties 102 for storing name, address, occupation, e-mail address, phone number, etc. Data links 105 of an entity object 101 may permit the entity object 101 to be linked to other entity objects (e.g., friends or business associates), linked to event objects (e.g., events attended or invited to), linked to document objects (e.g., authored), etc. In implementations of the system, a user may define object types to be applied by the system to unstructured data.

Property types may define the type and behavior of input data. Property types may define the structure of the data stored in an object property 102. The property type may define one or more data fields, the type of data associated with the field, as well as tools that may operate on the data fields. Property types may be simple, including a single data field, and/or may be composite, including multiple data fields. For example, an e-mail property type may define an e-mail object property. For example, the e-mail address john@acmeinc.com may be stored in an e-mail object property as follows: URI: com.property.Email, Base Type: Composite, with these components: EMAIL_USERNAME with the value "john," EMAIL_DOMAIN with the value "acmeinc.com." Further, the e-mail property type may define tools for parsing and concatenating the username and the domain, depending on what is required.

Link types may define the types of data links 105 that can exist between two objects 101. Links may be symmetric or asymmetric. All links may have one object that is considered the "parent" object, and the other that is the "child." In the case of symmetric links, e.g., "Spouse Of," which the parent and child objects are not contextually important. In the case of asymmetric links, like "Manager Of/Managed By," the parent and child may reflects the direction of the link.

Thus, the ontology of the object based data system may define the way in which data is organized in the object based data system. The ontology defines the types of objects that may be stored and the components of the defined data objects 101 as well as the manner in which the defined data objects may link to one another via data links 105.

Figure 2:
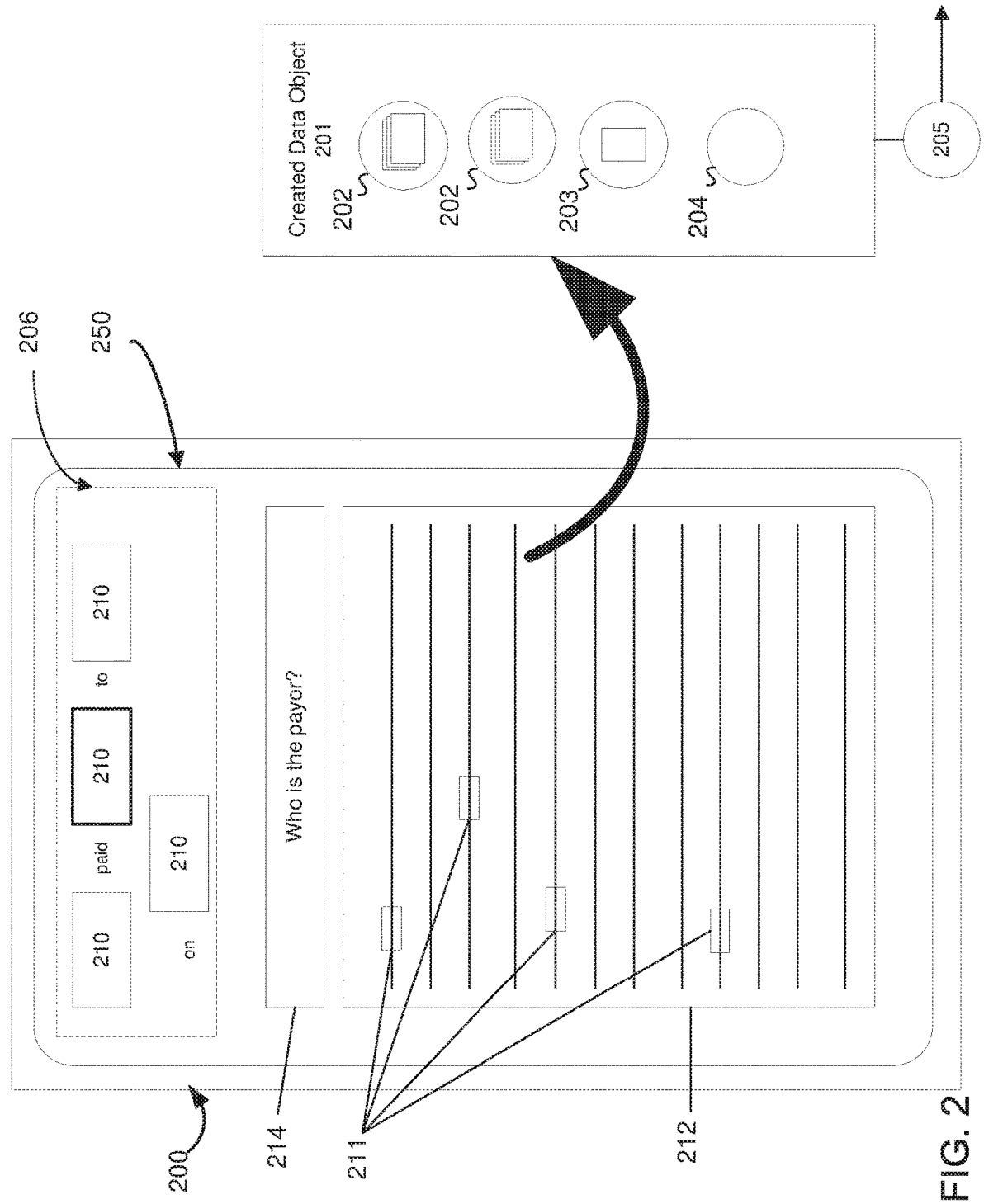
FIG. 2 depicts a user interface for facilitating the creation of data objects from unstructured data.

FIG. 2 depicts a user interface for facilitating the creation of data objects from unstructured data. A user may operate the interface via a personal user device, such as a laptop, tablet, smartphone, or other computing device. In some implementations, a remote server may provide the data object tagging tasks to the user device. Tasks may be transmitted to the user device individually, one by one, as the user completes each previous task. Tasks may also be transmitted to the user device in groups, wherein a user device receives multiple tasks at once to be completed before additional tasks are sent. In some implementations, data object tagging tasks may be generated by the user device itself, based either on remotely or locally stored data. In some implementations, data object tagging tasks may be provided as part of a crowd-sourcing project. In a crowd-sourcing project the same task may be provided to more than one user to improve the accuracy of tagging. In such an example, the system may extract a data object according to all of the user responses.

User device 200 may provide a data object tagging task to a user via user interface 250. User interface 250 may be configured to provide prompts to a user to assist in a task of tagging unstructured data for data object generation. A tagging task may be provided to a user for the generation or extraction of a created data object 201, including at least one or more object properties 202, one or more data notes 203, one or more media components 204, and one or more data links 205. Unstructured data 212, for example, free form text describing a cash transaction, may be displayed to a user. The structure of the created data object 201 may provide a template for the tagging task and may correspond to the description provided by the unstructured data 212. For example, a created data object 201 corresponding to unstructured data 212 describing a cash transaction may include object properties 202 for a payor, a payee, a dollar amount, and a transaction date.

The task provided to the user may include a tagging structure 206 including one or more tagging elements 210 and a narrative structure. Each tagging element 210 may include an element classification corresponding to an object property type to which it corresponds. For example, a tagging element 210 corresponding to the payor object property 202 may include an element classification that matches the object property type of the payor object property 202, i.e., a person's or institution's name. The narrative structure 206 may include information about relationships between object properties 202 to which tagging elements 210 correspond. For example, a narrative structure representing the relationship between a payor object A and a payee object B may be "A paid B." Narrative structure may further include information, such as hints, prompts, and questions, to describe attributes or characteristics of object properties 210. For example, prompt 214 may be included within the narrative structure of a tagging structure 206.

The system may perform natural language processing on the unstructured data 212. A natural language processing module in operation on the system may perform content detection on the text of unstructured data 212 and/or associated terms. As user herein, "terms" refers to words, groups of words, and/or phrases that may appear in the text of the unstructured data. Content detection may be used to recognize the grammar, structure, and content of the unstructured data 212. Content detection may be performed to determine the nature of the terms used in the text of unstructured data 212. For example, the natural language processing module may identify terms for their role as parts of speech (nouns, adjectives, etc.), role in sentences (subject, direct object, verb, etc.), and role in the overall content of the unstructured data 212 (e.g., whether the term plays a major or minor role).

The system may analyze the natural language processing results of the unstructured data 212 in accordance with tagging structure 206 to identify one or more potential term classifications of the terms used in the unstructured data 212. For example, natural language processing may determine that a term is the name of a person. When processed in accordance with tagging structure 206, the person names may be interpreted as potentially corresponding to object properties 202 that may accept a person's name, e.g., the payor and payee fields in the cash transaction example. Each term used in the unstructured data 212 may receive one or more potential term classifications according to the tagging structure 206 and natural language processing results. More than one potential term classifications may be applied to each term because some of the tagging elements 210 of tagging structure 206 may accept the same type of term. For example, the payor and payee fields of a cash transaction may both accept names of people or institutions.

The system may be configured to receive from the user, selections of terms corresponding to the tagging elements 210 of tagging structure 206. The system may assist the user in selecting the most appropriate terms for each tagging element 210. The system may highlight or otherwise emphasize or indicate a tagging element 210 field for which a corresponding term is sought. The system may provide the user with a prompt 214 providing information about the term being sought as a corresponding match to the highlighted tagging element 210. Prompt 214 may include a question, e.g., "Who is the payee?," as shown in FIG. 2. Prompt 214 may also include hints, single words, descriptions, and any other information useful in helping a user select an appropriate term to correspond to the tagging element. The system may further provide suggested terms 211 from the unstructured data 212 as being potential matches for tagging elements 210. Suggested terms 211 may be highlighted, bolded, italicized, or otherwise emphasized or indicated within the body of the unstructured document 212. Suggested terms 211 may be selected according to attributes shared with tagging elements 210 for which they are suggested to conform. The system may receive, from the user, a selection of one or more terms from the unstructured data 212 to correspond to the prompted tagging element 210. It is not required that the selected term be chosen from the suggested terms 211.

For example, in the cash transaction example, the system may prompt the user to successively choose terms from unstructured document 212 that correspond to tagging elements 210 based on the tagging structure 206 "[PERSON/INSTITUTION] paid [AMOUNT] to [PERSON/INSTITUTION] on [DATE]," as illustrated in FIG. 2. Prompt 214 may ask the user questions to assist in selecting the appropriate term, such as "Who is the payor?", "How much was paid?", "Who is the payee?", and "When was payment made?" In turn, the system may provide suggested terms 211 that correspond to the object property type required by tagging element 210. After a user has made a selection for each of the tagging elements 210, the tagging task may be completed by the system by generating created data object 201 from the user's selections, including at least one or more object properties 202, one or more data notes 203, and one or more media components 204 corresponding to the tagging elements 210.

In some implementations, the system may further prompt the user in the creation of one or more data links 205. For example, the system may present the user with a plurality of records and request that the user select the record corresponding to the just selected payee (or any other tagging element 210 of tagging structure 206.) The system may then generate a link 205 between the newly created data object 201 and the record selected by the user.

Tagging structure 206, tagging elements 210, created data object 201, and unstructured data 212 are discussed with respect to FIG. 2 in the context of a specific example. It is understood that the technology is not limited to the presented example, and that tasks generated by the system and presented to a user may be used to extract objects from unstructured data of many alternative forms.

Figure 3:
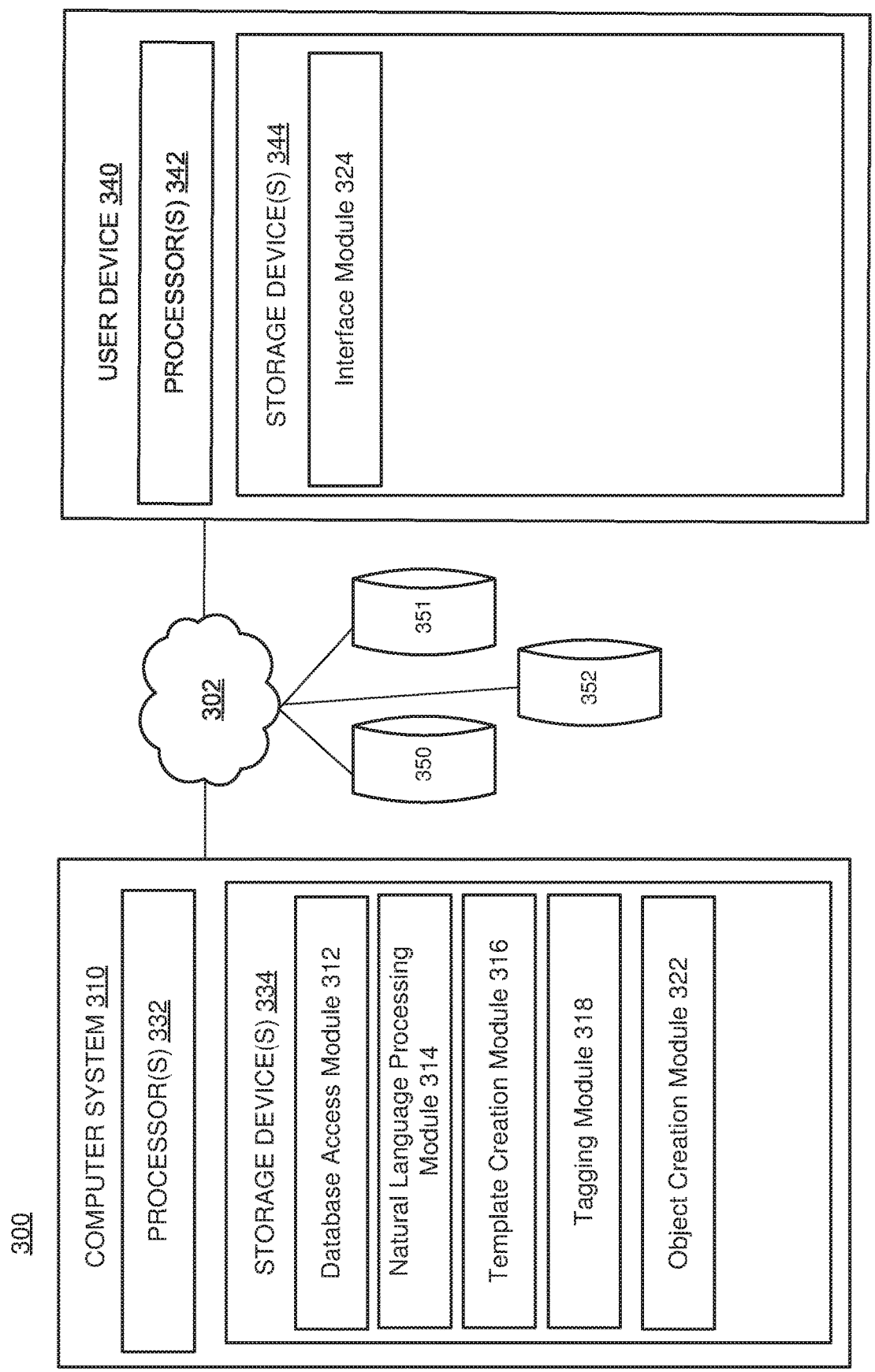
FIG. 3 depicts a system for data analysis assistance.

FIG. 3 depicts a system 300 for facilitating the transform and visualization of tabular based data. In one implementation, system 300 may include a computer system 310, a user device 340, a template storage module 350, an unstructured data storage module 351, and a created data object module 352, in communication via network 302, and/or other components. Data modules 350, 351, and 352 are illustrated in FIG. 1 as separate from computer system 310 and user device 340. In some implementations, data modules 350, 351, 352 may be stored on the computer system 310, user device 340, or at a remote location.

Template storage module 350 may be a computer memory configured to store data. Template storage module 350 may store tagging templates 206 for use by system 300 in facilitating tagging of and object generation from unstructured data. Unstructured data storage module 351 may be a computer memory configured to store data. Unstructured data storage module 351 may store unstructured data 212 from which the system 300 may extract organized data objects. Created data object module 352 may be a computer memory configured to store data. Created data object module 352 may store created data objects 201 generated by tagging operations of system 300.

Computer system 310 may be configured as a server (e.g., having one or more server blades, processors, etc.), a personal computer (e.g., a desktop computer, a laptop computer, etc.), a smartphone, a tablet computing device, and/or other device that can be programmed to receive tabular data or object based data, provide services for the manipulation of the data, and provide services for transformation and display of the data.

Figure 5:
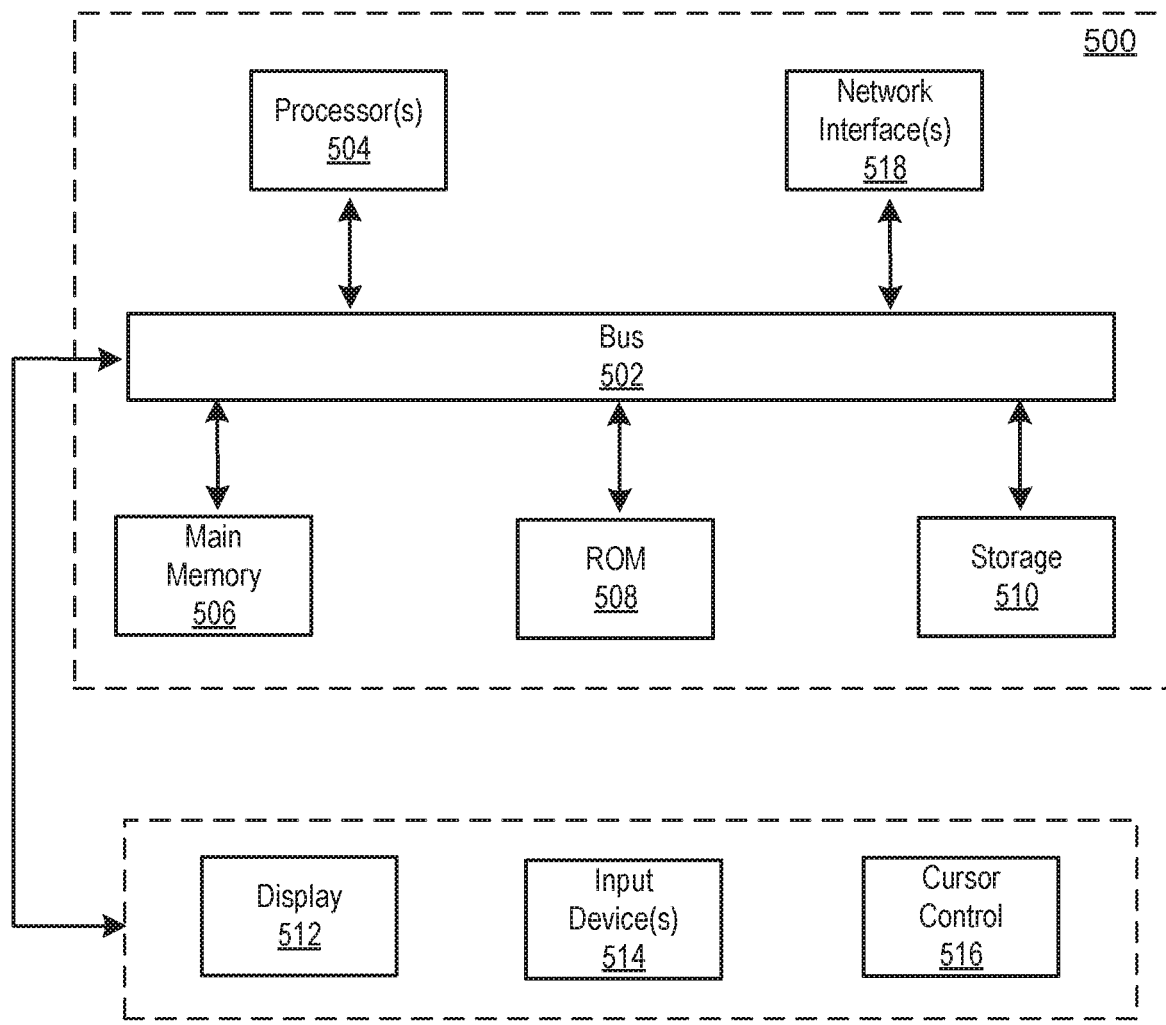
FIG. 5 depicts a block diagram of an example computer system in which any of the embodiments described herein may be implemented.

Computer system 310 may include one or more processors 332 (also interchangeably referred to herein as processors 332, processor(s) 332, or processor 332 for convenience), one or more storage devices 334, and/or other components. Processors 332 may be programmed by one or more computer program instructions stored on storage device 334. For example, processors 332 may be programmed by database access module 312, natural language processing module 314, template creation module 316, tagging module 318, object creation module 322, and/or other instructions that program computer system 310 to perform various operations, each of which are described in greater detail herein. As used herein, for convenience, the various instruction modules, systems, and engines will be described as performing an operation, when, in fact, the various instructions program the processors 332 (and therefore computer system 310) to perform the operation. Further details and features of a computer system 310 configured for implementing features of the described technology may be understood with respect to computer system 500 as illustrated in FIG. 5.

User device 340 may be configured as a server (e.g., having one or more server blades, processors, etc.), a personal computer (e.g., a desktop computer, a laptop computer, etc.), a smartphone, a tablet computing device, and/or other device that can be programmed to receive tabular data or object based data, provide services for the manipulation of the data, and provide services for transformation and display of the data.

User device 340 may include one or more processors 342 (also interchangeably referred to herein as processors 342, processor(s) 342, or processor 342 for convenience), one or more storage devices 344, and/or other components. Processors 342 may be programmed by one or more computer program instructions. For example, processors 342 may be programmed by interface module 324, and/or other instructions that program user device 340 to perform various operations, each of which are described in greater detail herein. As used herein, for convenience, the various instruction modules will be described as performing an operation, when, in fact, the various instructions program the processors 342 (and therefore user device 340) to perform the operation. User device 340 may further be programmed with database access module 312, natural language processing module 314, template creation module 316, tagging module 318, object creation module 322, as described with respect to computer system 310.

Various aspects of the transform facilitation system may operate on computer system 310 and/or on user device 340. That is, the various modules described herein may each operate on one or both of computer system 310 and/or user device 340.

Database access module 312, may be a software module operating on computer system 310 and/or user device 340. Database access module 312 may be configured to provide system access to data sources 350, 351, 352. Database access module 512 may be configured to read and write to data source 350, 351, 352, as well as carry out searches, queries, and any other database functionality required by computer system 310 and/or user device 340. Database access module 312 may access data objects 201, unstructured data 211, tagging structures 206, and any other data stored in memory.

Natural language processing module 314 may be a software module operating on computer system 310 and/or user device 340. Natural language processing module 314 may include programming instructions that cause the host computer system to perform natural language processing operations, including context recognition on unstructured textual data. In system 300, natural language processing module 314 may perform natural language processing on the terms of unstructured data 212. Natural language processing may determine characteristics of the terms used in unstructured data 212, both individually (e.g., parts of speech) and contextually (e.g., grammatical role in a sentence.) Natural language processing module 314 may assign term classifications to one or more of all the terms of the unstructured data 212. Identified characteristics of terms from unstructured data 212 may be used by other aspects of system 300 to assist with object generation and extraction.

Template creation module 316 may be a software module operating on computer system 310 and/or user device 340. Template creation module 316 may include programming instructions that cause the host computer system to receive template creation instructions from a user and create a tagging template 206. A tagging template 206 may be created to facilitate the creation, generation, and/or extraction of a specific data object 201. Thus, tagging template 206 may include one or more tagging elements 210, each associated with an object property of a data object 201. Template creation module 316 may generate the appropriate tagging elements 210 for a tagging template 206 according to the properties, fields, attributes, and characteristics of a data object 201. Template creation module 316 may further receive from a user a narrative structure describing the relationship between the object properties 202 of a data object 201.

Tagging module 318 may be a software module in operation on computer system 310 and/or user device 340. Tagging module 318 may include programming instructions that cause the host computer system to receive tagging instructions from a user and apply the instructions to the terms of unstructured data 212. Tagging module 318 may receive, via interface module 324, one or more selected terms of the unstructured data 212 indicated as corresponding to one or more tagging elements 210. Term classifications of the selected terms may match the element classifications of their corresponding tagging elements 210.

Object creation module 322 may be a software module operating on computer system 310 and/or user device 340. Object creation module 322 may include programming instructions that cause the host computer system to create or generate a data object 201 from the unstructured data 212 according to the selected terms corresponding to the tagging elements 210 of the tagging template 206. As discussed above, the tagging elements 210 of tagging template 206 may each correspond to an object property 202 of a data object 201. Accordingly, the selected terms received from the user, which each correspond to a tagging element 210 of the tagging template 206, may also correspond to the object properties 202 of a data object 201. Object creation module 322 may generate a data object 201 based on the selected terms corresponding to the tagging elements 201. Thus, a data object 201 may be generated from unstructured data 212.

Interface module 324 may be a software module operating on computer system 310 and/or user device 340. Interface module 324 may include programming instructions that cause the host computer system to provide a computer display interface to a user and to receive input from the user. Interface module 324 may generate and provide interface 250 to a user via a computer display. Interface module 324 may be configured to present to the user, via a generated interface, unstructured data 212, tagging template 206, and prompt 214. Interface module 324 may be configured to highlight suggested terms 211 according to a comparison between element classifications of tagging elements 210 and term classifications of the suggested terms 211. Interface module 324 may be configured to guide a user through the successive selection of selected terms corresponding to tagging elements 210 by providing prompt 214 and highlighting suggested terms 211. Interface module 324 may be configured to receive user input identifying selected terms. Interface module 324 may be configured to transmit information indicative of the user inputs about selected terms to tagging module 320 for creation of data object 201.

Although illustrated in FIG. 3 as a single component, computer system 310 and user device 340 may each include a plurality of individual components (e.g., computer devices) each programmed with at least some of the functions described herein. In this manner, some components of computer system 310 and/or user device 340 may perform some functions while other components may perform other functions, as would be appreciated. The one or more processors 332, 342 may each include one or more physical processors that are programmed by computer program instructions. The various instructions described herein are exemplary only. Other configurations and numbers of instructions may be used, so long as the processor(s) 332, 342 are programmed to perform the functions described herein.

Furthermore, it should be appreciated that although the various instructions are illustrated in FIG. 3 as being co-located within a single processing unit, in implementations in which processor(s) 332, 342 includes multiple processing units, one or more instructions may be executed remotely from the other instructions.

Additionally, the modular software breakdown as illustrated in FIG. 3 is prepared for illustrative purposes only. The various instructions described with respect to specific software modules may be implemented by alternative software modules configured in different arrangements and with alternative function sets.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 332, 342 may be programmed by one or more additional instructions that may perform some or all of the functionality attributed herein to one of the instructions.

The various instructions described herein may be stored in a storage device 334, 344 which may comprise random access memory (RAM), read only memory (ROM), and/or other memory. The storage device may store the computer program instructions (e.g., the aforementioned instructions) to be executed by processor 332, 342 as well as data that may be manipulated by processor 332, 342. The storage device may comprise floppy disks, hard disks, optical disks, tapes, or other storage media for storing computer-executable instructions and/or data.

The various components illustrated in FIG. 3 may be coupled to at least one other component via a network 302, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 3, as well as in other drawing Figures, different numbers of entities than those depicted may be used. Furthermore, according to various implementations, the components described herein may be implemented in hardware and/or software that configure hardware.

Figure 4:
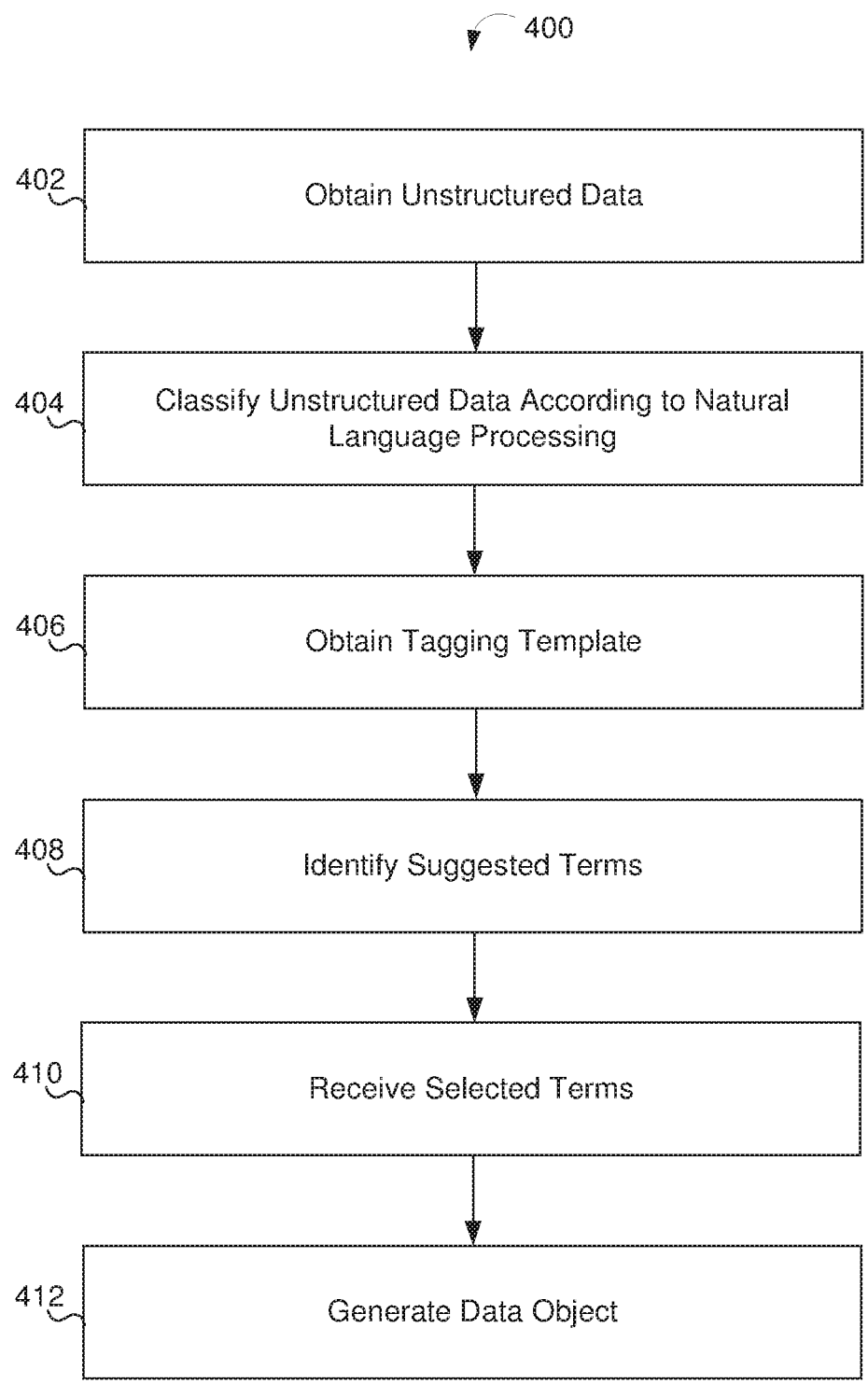
FIG. 4 depicts a process flow chart of a method for performing data analysis, according to some implementations.

FIG. 4 depicts a process flow chart of a method 400 for extracting data objects from unstructured data. The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, method 400 may include obtaining unstructured data 212. Unstructured data may be obtained, for example, from unstructured data storage module 351, by database access module 312. Obtained unstructured data 212 may be used for the generation of data objects 201 based on the data. Obtaining unstructured data 212 may include obtaining a single unstructured document for the generation of a single corresponding data object 201 and/or may include obtaining many unstructured documents for the generation of a corresponding number of data objects 201.

In an operation 404, the unstructured data 212 may be processed via natural language processing. Natural language processing module 314 may operate to classify the terms of unstructured data 212. Unstructured data 212 may be stored in unstructured data storage module 351 with information about the term classifications for later access. In some implementations, unstructured data 212 and associated classified terms may be transmitted to interface module 324 for display to a user via a computer display.

In an operation 406, a tagging template 206 may be obtained. Tagging template 206 may be obtained by database access module 312 from template data storage module 350. The obtained tagging template 206 may include one or more tagging elements 210 and a narrative structure indicating a relationship between the tagging elements 210.

In an operation 408, method 400 may include identifying suggested terms 211 in unstructured data 212. Identified suggested terms 211 may include a term classification (as determined by natural language processing) that matches an element classification of the tagging element 210 for which it is suggested as a match.

In an operation 410, method 400 may include receiving one or more selected terms corresponding to tagging elements 210 and according to user input. Interface module 324 may be provided to facilitate input from a user designating terms to correspond to the tagging elements 210 of tagging template 206 as selected terms. The selected terms may be transmitted by interface module 324 to tagging module 318.

In an operation 412, method 400 may include generating or creating a data object from the unstructured data 212 and according the one or more selected terms corresponding to tagging elements 210 of tagging template 206. Each of the selected terms may correspond to a tagging element 210, which may in turn correspond to a data object property 202 of a created data object 201. The generated data object 201 may thus be generated from the unstructured data 212 in an organized fashion. The generated data object 201 may be associated with the unstructured data 212 such that the source of the object properties 202 data object 201 may remain known. In some implementations, unstructured data 212 may be included in data object 201.

Thus, object extraction method 400 may provide a method for extracting organized object based data from an unstructured data set. A user's assistance may be facilitated during the data extraction process. The user may provide input by selecting terms from the unstructured data set that match the object properties 202 of the data object 201 being created. The system may assist the user in selecting the correct terms by highlighting or otherwise emphasizing terms in the unstructured data 212 that may match the object properties 202.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet)

and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for extracting object data from an unstructured document:
   one or more processors and a memory storing instructions that, when executed by the one or more processors, cause the system to:
      store an unstructured document in a first portion of an electronic storage;
      store tagging templates in a second portion of the electronic storage;
      retrieve the unstructured document from the first portion, the unstructured document comprising a plurality of terms, each term including at least one word, wherein the unstructured document is converted to a particular ontology;

assign a term classification to the plurality of terms of the unstructured document via natural language processing;

obtain a tagging template, of the tagging templates, from the second portion, for the unstructured document, the tagging template comprising tagging elements, each tagging element having an element classification, the tagging template being obtained based on the particular ontology and a description of the unstructured document, the plurality of tagging elements of the tagging template corresponding to one or more properties of the particular ontology;

receive, from a user via an interface, a plurality of selected terms corresponding to the plurality of tagging elements, wherein the term classifications of the selected terms matches the element classification of the corresponding tagging elements; and generate, from the unstructured document based on the plurality of selected terms corresponding to the plurality of tagging elements, a data object organized according to the particular ontology to extract organized object-based data from the unstructured document, the generating of the data object comprising converting the subset and the tagging elements to properties of the data object;

store the data object in a third portion of the electronic storage;

map the data object to the unstructured data in the first portion to reveal a source of the data object;

ingest the data object into an object-based data analysis platform; and analyze the data object using an object-based data analysis platform.

2. The system of claim 1, wherein the system is further caused to:
determine a selected tagging element from the plurality of tagging elements;
identify, to the user, suggested terms from the plurality of selected terms having a term classification matching the element classification of the selected tagging element.

3. The system of claim 1, wherein the system is further caused to create the tagging template by generating the plurality of tagging elements of the tagging template according to a required data object structure and the generated data object conforms to the required data object structure.

4. The system of claim 3, wherein the system is further caused to receive, from a user, a narrative structure indicative of at least one relationship between the plurality of tagging elements of the tagging template.

5. The system of claim 4, wherein the system is further caused to:
determine a mapping between the narrative structure and the tagging elements; and
provide, to the user via the interface, a visual display of the plurality of tagging elements and the narrative structure, according to the mapping, indicating the relationship between the plurality of tagging elements.

6. The system of claim 1, wherein the system is further caused to:
determine a selected tagging element from the plurality of tagging elements; and
provide, to the user, a prompt providing information about at least one characteristic of the selected tagging element.

7. The system of claim 1, wherein the system is further caused to:
determine a first selected tagging element from the plurality of tagging elements;
identify the first selected tagging element to the user;
receive a first selected term corresponding to the first selected tagging element according to user input;
determine a second selected tagging element from the plurality of tagging elements;
identify the second selected tagging element to the user;
receive a second selected term corresponding to the second selected tagging element according to user input,
wherein the plurality of selected terms includes at least the first selected term and the second selected term.

8. The system of claim 1, wherein the system is further caused to:
receive, from a user, a selection of a second data object; and
store a data link between the generated data object and the selected second data object.

9. The system of claim 1, wherein the system is further caused to:
receive, from a second user, a second plurality of selected terms corresponding to the plurality of tagging elements, wherein the term classifications of the selected terms matches the element classification of the corresponding tagging elements;
receive, from a third user, a third plurality of selected terms corresponding to the plurality of tagging elements, wherein the term classifications of the selected terms matches the element classification of the corresponding tagging elements; and
wherein to generate the data object from the unstructured document the system is caused to generate the data object according to the plurality of selected terms, the second plurality of selected terms, and the third plurality of selected terms.

10. The system of claim 1, wherein to assign the term classification to the plurality of terms, the system is further caused to assign to each of the plurality of terms at least one of a part of speech and a grammatical role.

11. The system of claim 1, wherein the data object comprises media components corresponding to the tagging elements.

12. A method for extracting object data from an unstructured document, the method being performed on a computer system having one or more physical processors programmed with computer program instructions that, when executed by the one or more physical processors, cause the computer system to perform the method, the method comprising:
storing an unstructured document in a first portion of an electronic storage;
storing tagging templates in a second portion of the electronic storage;
retrieving, by the computer system, the unstructured document comprising a plurality of terms, each term including at least one word, wherein the unstructured document is converted to a particular ontology;
assigning, by the computer system, a term classification to the plurality of terms of the unstructured document via natural language processing;
obtaining, by the computer system, a tagging template, of the tagging templates, from the second portion, for the unstructured document, the tagging template comprising tagging elements, each tagging element having an element classification, the tagging template being obtained based on the particular ontology and a description of the unstructured document, the plurality of tagging elements of the tagging template corresponding to one or more properties of the particular ontology;

receiving, by the computer system, from a user via an interface, a plurality of selected terms corresponding to the plurality of tagging elements, wherein the term classifications of the selected terms matches the element classification of the corresponding tagging elements; and generating, by the computer system from the unstructured document based on the plurality of selected terms corresponding to the plurality of tagging elements, a data object organized according to the particular ontology to extract organized object-based data from the unstructured document, the generating of the data object comprising converting the subset and the tagging elements to properties of the data object;

storing the data object in a third portion of the electronic storage;

mapping the data object to the unstructured data in the first portion to reveal a source of the data object;

ingesting the data object into an object-based data analysis platform; and analyzing the data object using an object-based data analysis platform.

13. The method of claim 12, further comprising:
determining, by the computer system, a selected tagging element from the plurality of tagging elements;
identify, to the user, suggested terms from the plurality of selected terms having a term classification matching the element classification of the selected tagging element.

14. The method of claim 12, wherein creating the tagging template includes generating the plurality of tagging elements of the tagging template according to a required data object structure and the generated data object conforms to the required data object structure.

15. The method of claim 14, further comprising receiving, by the computer system, from a user, a narrative structure indicative of at least one relationship between the plurality of tagging elements of the tagging template.

16. The method of claim 15, further comprising:
determining a mapping between the narrative structure and the tagging elements; and
providing, by the computer system, to the user via the interface, a visual display of the plurality of tagging elements and the narrative structure, according to the mapping, indicating the relationship between the plurality of tagging elements.

17. The method of claim 12, further comprising:
determining, by the computer system a selected tagging element from the plurality of tagging elements; and
providing, by the computer system, to the user, a prompt providing information about at least one characteristic of the selected tagging element.

18. The method of claim 12, further comprising:
determining, by the computer system, a first selected tagging element from the plurality of tagging elements;
identifying, by the computer system, the first selected tagging element to the user;
receiving, by the computer system, a first selected term corresponding to the first selected tagging element according to user input;
determining, by the computer system a second selected tagging element from the plurality of tagging elements;
identifying, by the computer system, the second selected tagging element to the user; and
receiving, by the computer system, a second selected term corresponding to the second selected tagging element according to user input,
wherein the plurality of selected terms includes at least the first selected term and the second selected term.

19. The method of claim 12, further comprising:
receiving, by the computer system, from a second user, a second plurality of selected terms corresponding to the plurality of tagging elements, wherein the term classifications of the selected terms matches the element classification of the corresponding tagging elements;
receiving, by the computer system, from a third user, a third plurality of selected terms corresponding to the plurality of tagging elements, wherein the term classifications of the selected terms matches the element classification of the corresponding tagging elements; and
wherein generating the data object from the unstructured document further includes generating the data object according to the plurality of selected terms, the second plurality of selected terms, and the third plurality of selected terms.

20. The method of claim 12, wherein assigning the term classification to the plurality of terms further includes assigning, by the computer system, to each of the plurality of terms at least one of a part of speech and a grammatical role.

* * * * *